(12) United States Patent
Chen

(10) Patent No.: US 7,526,982 B2
(45) Date of Patent: May 5, 2009

(54) BICYCLE TOE POSITIONING DEVICE

(76) Inventor: Chung-I Chen, 235 Chung - Ho Box 8-24, Taipei (TW)

( * ) Notice: Subject to any disclaimer, the term of this patent is extended or adjusted under 35 U.S.C. 154(b) by 0 days.

(21) Appl. No.: 11/725,650

(22) Filed: Mar. 21, 2007

(65) Prior Publication Data

US 2008/0229874 A1    Sep. 25, 2008

(51) Int. Cl.
*B62M 3/00*    (2006.01)
(52) U.S. Cl. .................... 74/594.6; 74/594.4
(58) Field of Classification Search ............. 74/594.4, 74/594.6; 36/131
See application file for complete search history.

(56) References Cited

U.S. PATENT DOCUMENTS

| | | | | |
|---|---|---|---|---|
| 5,060,537 | A * | 10/1991 | Nagano | 74/594.6 |
| 5,377,561 | A * | 1/1995 | Danieli et al. | 74/594.6 |
| 5,765,450 | A * | 6/1998 | Kruger et al. | 74/594.6 |
| 5,931,053 | A * | 8/1999 | Chen | 74/594.6 |
| 6,694,846 | B2 * | 2/2004 | Muraoka et al. | 74/594.6 |
| 6,722,229 | B2 * | 4/2004 | Muraoka | 74/594.6 |
| 6,837,128 | B2 * | 1/2005 | Campagnolo | 74/594.6 |
| 7,073,409 | B2 * | 7/2006 | Ho | 74/594.6 |
| 7,240,587 | B2 * | 7/2007 | Plassiard et al. | 74/594.6 |
| 2005/0252337 | A1 * | 11/2005 | Chen | 74/594.6 |
| 2006/0053963 | A1 * | 3/2006 | Xie | 74/594.6 |

FOREIGN PATENT DOCUMENTS

FR    2 699 492    *    6/1994    ............ 74/594.6

* cited by examiner

Primary Examiner—Vinh T. Luong

(57) ABSTRACT

A bicycle toe positioning device comprises a treadle having a main body which is formed with an axial hole, an axial rod and a bearing set. The treadle is further formed with a first clamping portion and a second clamping portion. A tightening unit has a first positioning end and a second positioning end. In assembly, the first clamping portion is buckled to a rib and a pair of wings of the first positioning end. The second clamping portion is secured to the second positioning end so that the treadle is secured to the toe positioning unit. The first clamping portion has a buckling block which is fixed to the treadle by using an pivotal rod. A spring is retained in the first clamping portion and an adjust unit serves to adjust the tightness of the buckling block.

2 Claims, 5 Drawing Sheets

BICYCLE TOE POSITIONING DEVICE

FIELD OF THE INVENTION

The present invention relates to bicycles parts, and particularly to a bicycle toe positioning device, wherein other than using an elastic unit, a rib and two wings are used fixed the treadle so as to provide a firm structure to the treadle.

BACKGROUND OF THE INVENTION

In the prior art bicycle, the treadle is combined with a toe positioning device. The treadle is installed with a front clamper and a rear clamper which provides elastic tightening forces so as to position the bicycle toe positioning device so that the legs of the user can combine with the treadle. When the legs of the user desire to leave from the treadles, the legs rotate to make the bicycle toe positioning device to separate from the front clamper and the rear clampers. Thus the legs can leave from the toe positioning device.

However, in driving the bicycle, it is possible that the leg of the user rotates so that the toe positioning device separates from the treadle. As a result, it is possible that some accident occurs.

Therefore, in one improvement, the elastic units of the front clamper and the rear clamper are arranged with respective screws as adjusters. Rotating the screw will tighten the elastic unit which has a form of a twisting spring. Thus the front clamper and the rear clamper provide more forces to tightly clamp the toe positioning device.

However, increment of the clamping force will make the spring deform. If the elastic unit is over-tight due to the screw force from the screw, it is possible that the spring will fatigue so that the driver cannot concentrate his (or her) attention to drive the bicycle.

Thus it is known that only provide adjusters to the toe positioning device is not enough for resolving the problem of the toe positioning device to separate from the treadle due to a mistake in the operation. Other design is necessary to provide a more safe and concrete structure to the toe positioning device so as to achieve the requirement of safety driving and easy operation in driving a bicycle.

SUMMARY OF THE INVENTION

Accordingly, the primary object of the present invention is to provide a bicycle toe positioning device, wherein other than using an elastic unit, a rib and two wings are used fixed the treadle so as to provide a firm structure to the treadle.

To achieve above objects, the present invention provides a bicycle toe positioning device comprising: a treadle having a main body which is formed with an axial hole, an axial rod and a bearing set; the axial rod and the bearing set pass through the axial hole; a first clamping portion installed to one end of the main body of the treadle; the first clamping portion includes an approximate U shape buckling block; the buckling block being pivoted to the main body of the treadle by using a pivotal rod; an elastic unit enclosing around the pivotal rod; the elastic unit being a twisting spring; one end of the elastic unit resisting against a resisting edge of the treadle and another end thereof resists against the buckling block so as to firmly secure the first clamping portion to main body of the treadle; and a toe positioning unit having a first positioning end; the first positioning end being positioned corresponding to the first clamping portion of the treadle; an inner center of the first clamping portion having a rib portion and a pair of wings at two sides of the rib portion; the rib portion protruding from a center of the first positioning end; the wings being outwards inclined at the two sides of the rib portion; the rib portion being tightly buckled to an outer edge of the buckling block and serves to position and buckle the first clamping portion of the treadle; the two wings tightly resists against two outer sides of the buckling block so as to further position the buckling block.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
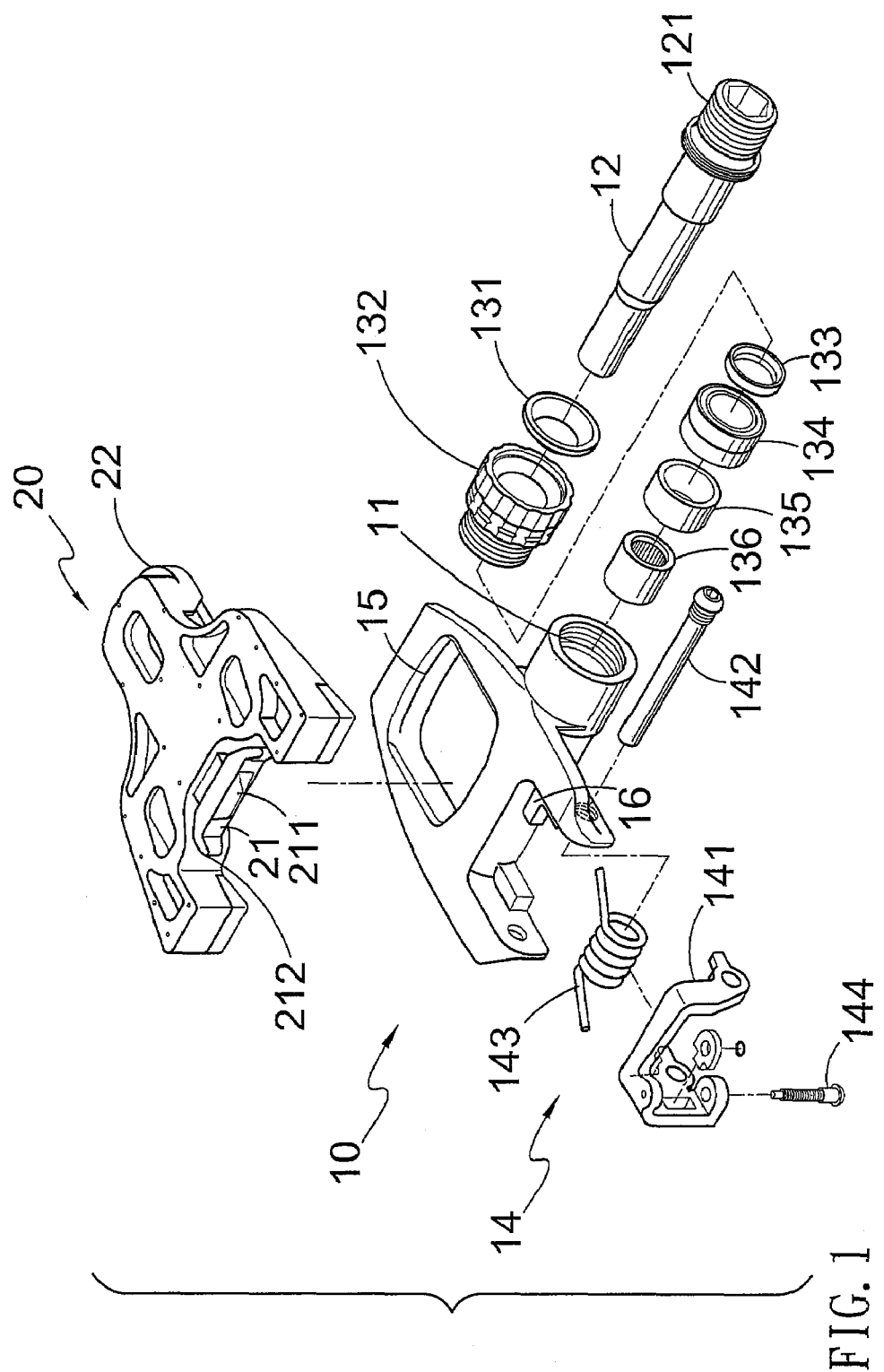
FIG. 1 is an exploded perspective view of the bicycle toe positioning device of the present invention.
Figure 2:
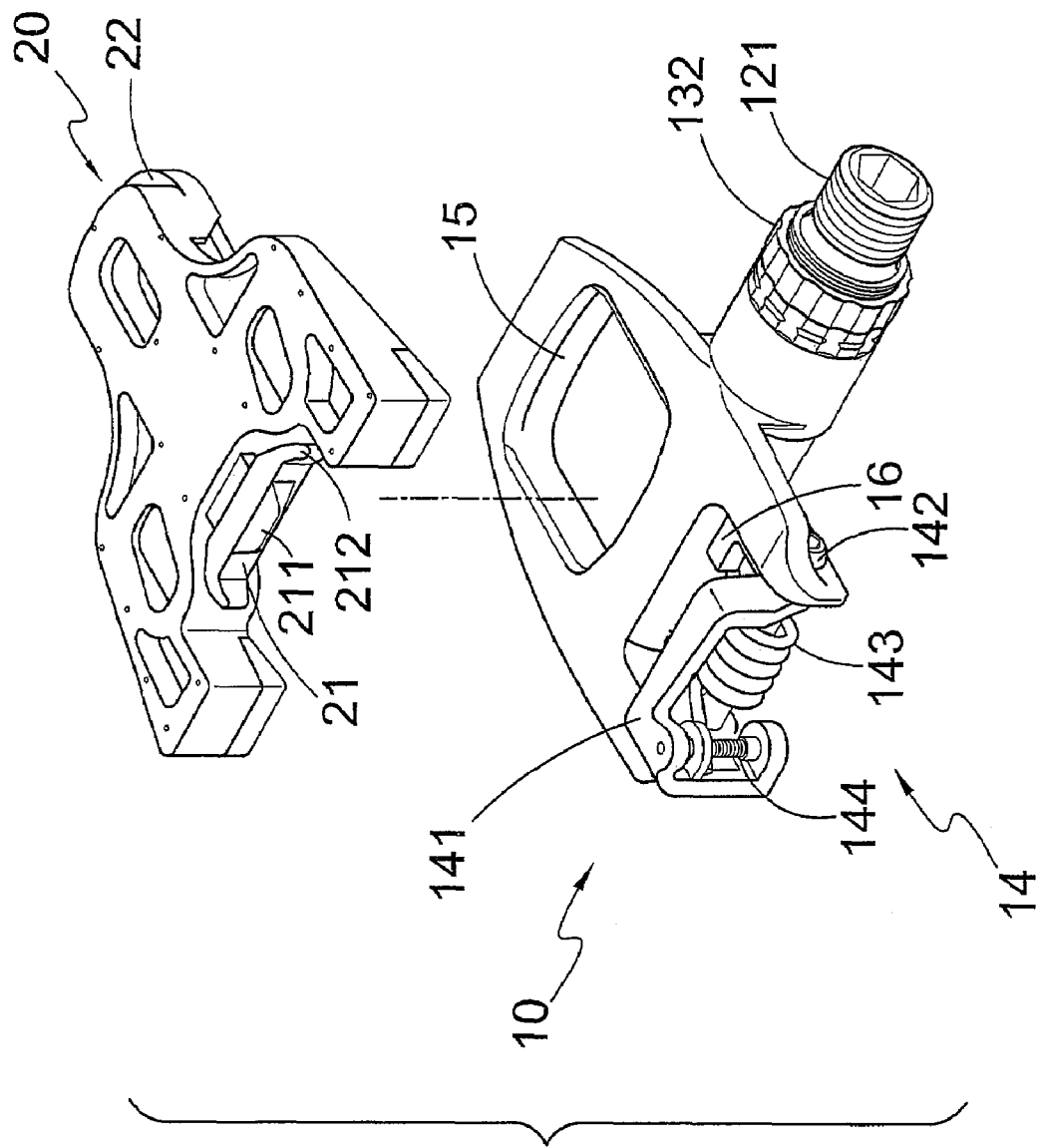
FIG. 2 is a schematic view about the bicycle toe positioning device of the present invention.
Figure 3:
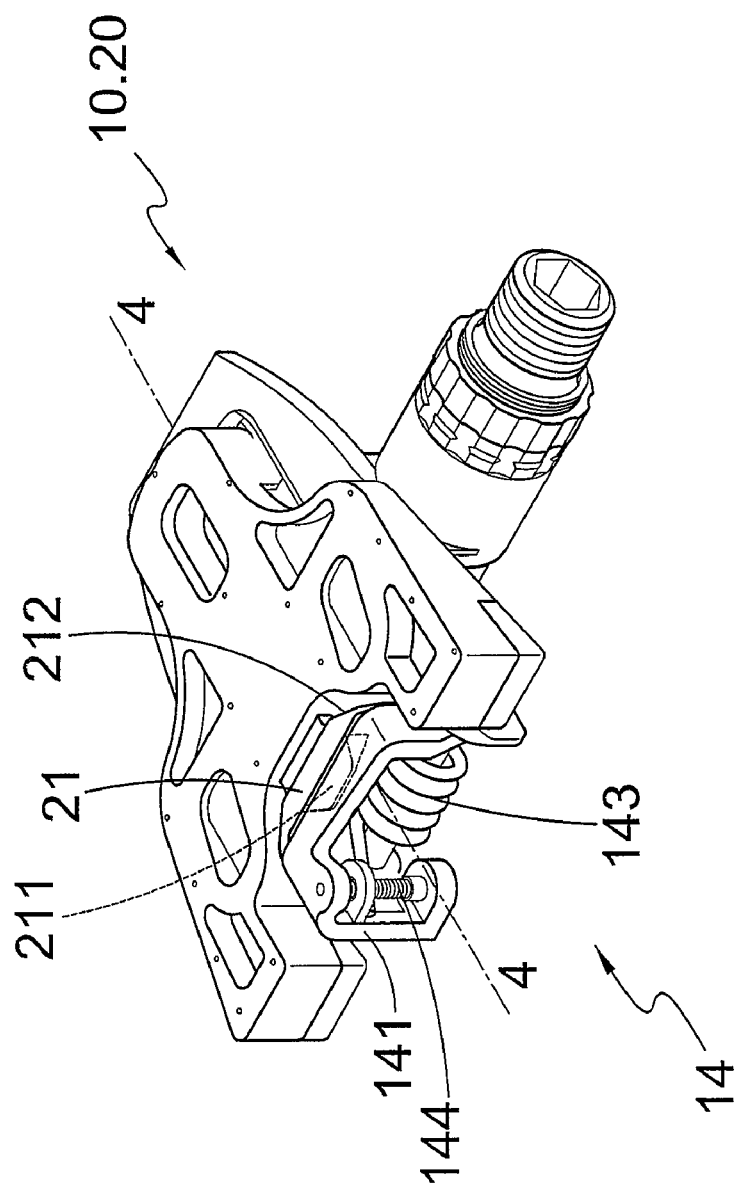
FIG. 3 is a perspective view showing the assembled bicycle toe positioning device of the present invention.

With reference to FIGS. 1 to 3, the bicycle toe positioning device is illustrated. The present invention has the following elements.

A treadle 10 has a main body which is formed with an axial hole 11 at a central portion thereof, an axial rod 12 and a bearing set. The axial rod 12 and the bearing set pass through the axial hole 11. The bearing set is formed by an oil sealing 131, an outer cover 132, a washer 133, a bearing 134, and a ring 136. The bearing set makes the axial rod 12 to pivotally combine in the axial hole 11. One end of the axial rod 12 exposes out of the body. The exposed end is a connecting end 121 which serves to combine with a bicycle body.

Two ends of the main body of the treadle 10 are formed with a first clamping portion 14 and a second clamping portion 15, respectively. The first clamping portion 14 includes an approximate U shape buckling block 141. The buckling block 141 is pivoted to the main body of the treadle 10 by using a pivotal rod 142. An elastic unit 143 encloses around the pivotal rod 142. The elastic unit 143 is a twisting spring. One end of the elastic unit 143 resists against a resisting edge 16 of the treadle 10 and another end thereof resists against the buckling block 141 so as to firmly secure the first clamping portion 14 to the main body of the treadle 10. The buckling block 141 is installed with an adjust unit 144. In this embodiment, the adjust unit 144 is realized by a screw. By screwing the adjust unit 144, the tightness of the elastic unit 143 is adjustable. In this embodiment, the second clamping portion 15 of the treadle 10 is integrally formed on the treadle 10. The second clamping portion 15 has a hollow portion. However, the second clamping portion 15 may be identical to the first clamping portion 14.

The toe positioning unit 20 is a Y shape structure. The toe positioning unit 20 is formed by a first positioning end 21 and a second positioning end 22.

The first positioning end 21 is positioned corresponding to the first clamping portion 14 of the treadle 10. The first positioning end 21 is formed as a U shape structure. An inner center of the first clamping portion 14 has a rib portion 211 and a pair of wings 212 at two sides of the rib portion 211. The rib portion 211 protrudes from a center of the first positioning end 21. The wings 212 are outwards inclined at the two sides of the rib portion 211. The rib portion 211 is tightly buckled to an outer edge of the buckling block 141 and serves to position and buckle the first clamping portion 14 of the treadle 10. The two wings 212 tightly resist against two outer sides of the buckling block 141 so as to further position the buckling block 141. Thereby the first positioning end 21 is firmly secured to the first clamping portion 14 without falling out.

In this the present invention, the second positioning end 22 of the toe positioning unit 20 is integrally formed to and protruded from a front end of the first positioning end 21 for retaining the second clamping portion 15. However, in the present invention, the second positioning end 22 may have a form identical to that of the first positioning end 21.

Figure 5:
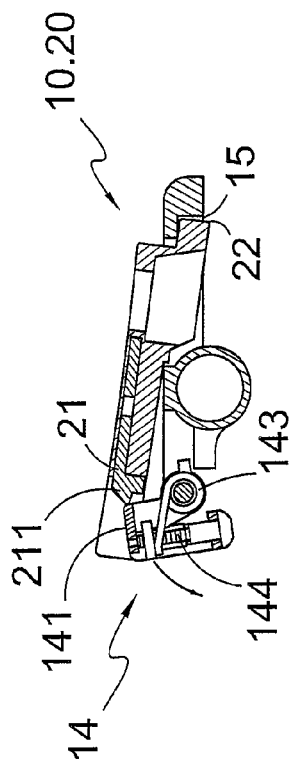
FIGS. 4 to 6 are schematic cross sectional views along line 44 of FIG. 3 showing the assembly process of the bicycle toe positioning device of the present invention.
Figure 4:
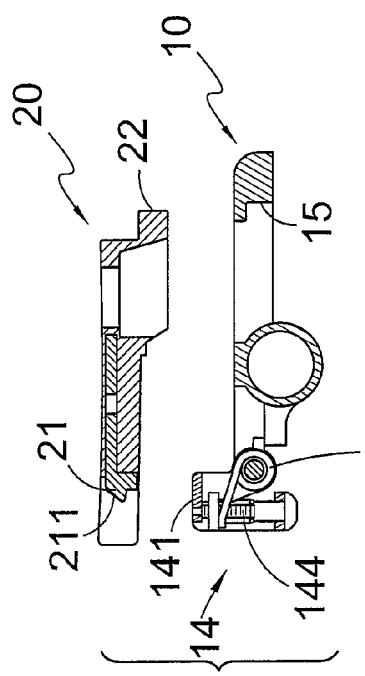
Figure 6:
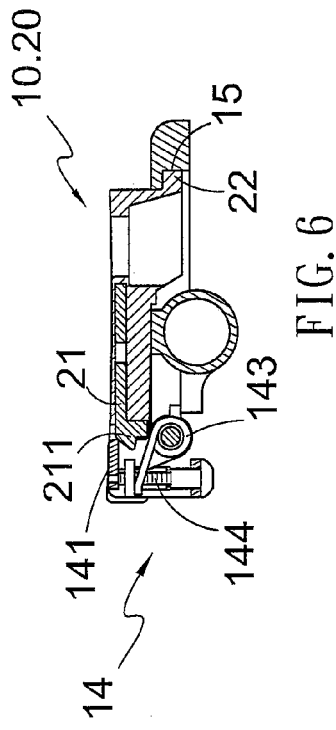
Figure 8:
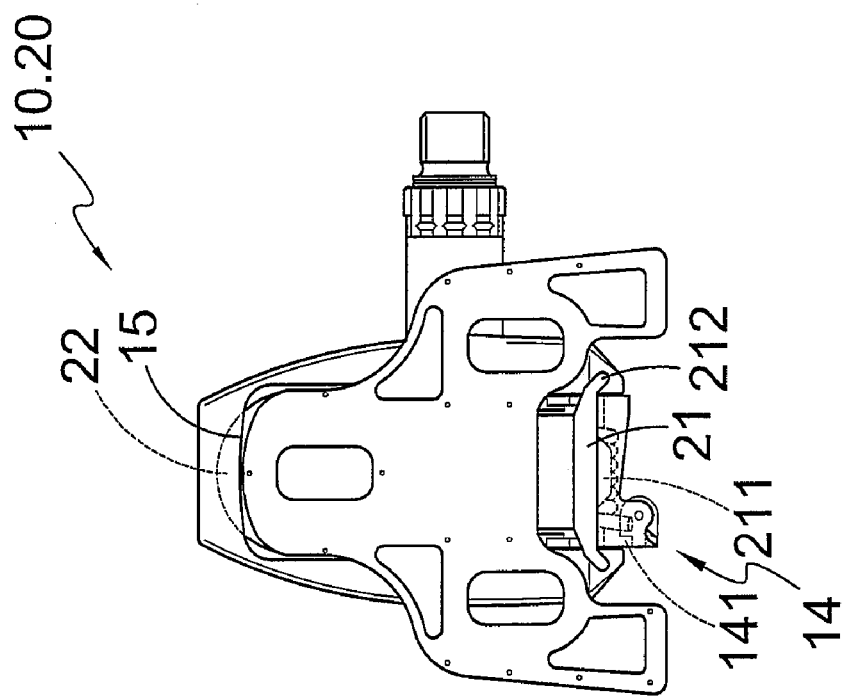
FIG. 8 is an elevation view showing an assembled treadle and toe positioning unit of the bicycle toe positioning device of the present invention.
Figure 7:
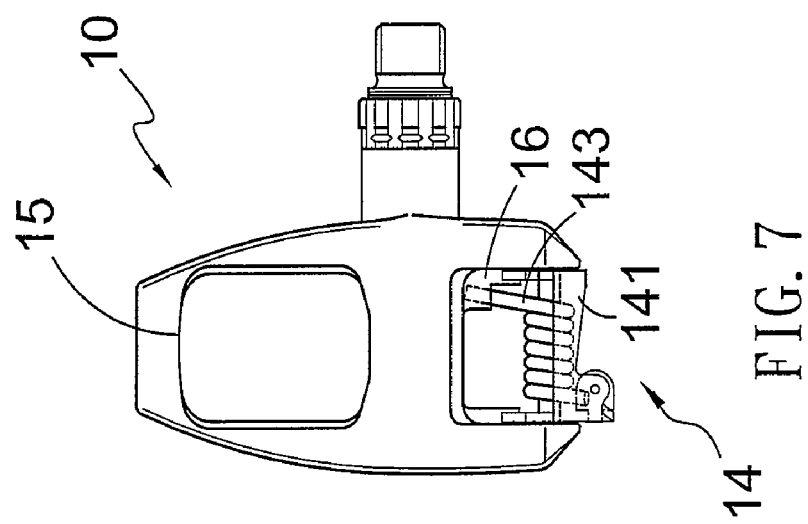
FIG. 7 is an elevation view showing the treadle of the bicycle toe positioning device of the present invention.

In assembly of the present invention, referring to FIG. 4, the treadle 10 is aligned to the toe positioning unit 20. The first clamping portion 14 is positioned corresponding to the first positioning end 21 and the second clamping portion 15 is positioned corresponding to the second positioning end 22. Referring to FIG. 5, the second positioning end 22 is inserted the hollow portion of the second clamping portion 15. The first positioning end 21 positions the first clamping portion 14. With reference to FIG. 6, the first positioning end 21 is buckled with the buckling block 141 of the first clamping portion 14 of the treadle 10. The second positioning end 22 is secured to the second clamping portion 15. Thus the assembly of the toe positioning device of the present invention is complete.

In assembly of the toe positioning device of the present invention, the second positioning end 22 is secured to the second clamping portion 15 and the first positioning end 21 is secured to the first clamping portion 14. In detachment the treadle 10 from the toe positioning unit 20, the first positioning end 21 is driven to slide out of the first clamping portion 14 so as to prevent the first positioning end 21 of the toe positioning unit 20 from sliding out of the first clamping portion 14 of the treadle 10 as the user treads the treadle 10. The two wings 212 resist against outer sides of the first clamping portion 14 for preventing the toe positioning unit 20 from separation with the treadle 10.

Moreover, the adjust unit 144 of the first clamping portion 14 for adjusting the tightness of the first clamping portion 14 to the treadle 10 is performed by tightly resisting the elastic unit 143. The two wings 212 have the effect of fixing the elastic unit 143 so as to reduce the tight force provided by the elastic unit 143. As a result, the lifetime of the elastic unit 143 is prolonged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle toe positioning device comprising:
a treadle having a main body; the main body being formed with an axial hole at a central portion thereof, an axial rod and a bearing set; the axial rod and the bearing set passing through the axial hole; the bearing set being formed by an oil sealing, an outer cover, a washer, a bearing, and a ring; the bearing set causing the axial rod to pivotally combine in the axial hole; one end of the axial rod exposing out of the main body; the exposed end being a connecting end which serves to combine with a bicycle body;

two ends of the main body of the treadle being formed with a first clamping portion and a second clamping portion, respectively; the first clamping portion including an approximate U shape buckling block; the buckling block being pivoted to the main body of the treadle by using a pivotal rod; an elastic unit enclosing around the pivotal rod; the elastic unit being twisting spring; one end of the elastic unit resisting against a resisting edge of the treadle and another end thereof resisting against the buckling block so as to firmly secure the first clamping portion to the main body of the treadle; the buckling block being installed with an adjust unit; the adjusting unit being arranged at one inner side of the buckling block; by screwing the adjust unit, the tightness of the elastic unit is adjustable; only one spring being arranged within the buckling block; the buckling block having a U shape cross section having a bar extending with two legs at two ends thereof;

the second clamping portion of the treadle being integrally formed on treadle; the second clamping portion having a hollow portion;

a toe positioning unit being a Y shape structure; the toe positioning unit being formed by a first positioning end and a second positioning end; after assembly, two outer sides of the buckling block resisting against two inner sides of the toe positioning unit;

the first positioning end being positioned corresponding to the first clamping portion of the treadle; the first positioning end being formed as a U shape structure; an inner center of the first clamping portion having a rib portion and a pair of wings at two sides of the rib portion; the rib portion protruding from a center of the first positioning end; the wings are outwards inclined at the two sides of the rib portion; the rib portion being tightly buckled to an outer edge of the buckling block and serving to position and buckle the first clamping portion of the treadle; the two wings tightly resisting against two outer sides of the buckling block so as to further position the buckling block; thereby, the first positioning end being firmly secured to the first clamping portion without falling out;

the second positioning end of the toe positioning unit being integrally formed to and protruded from a front end of the first positioning end for retaining the second clamping portion;

wherein in assembly, the treadle is aligned to the toe positioning unit; the first clamping portion is positioned corresponding to the first positioning end and the second clamping portion is positioned corresponding to the second positioning end; the second positioning end is inserted the hollow portion of the second clamping portion; the first positioning end positions the first clamping portion, the first positioning end is buckled with the buckling block of the first clamping portion of the treadle; the second positioning end is secured to the second clamping portion.

2. The bicycle toe positioning device as claimed in claim 1, wherein the adjust unit is a screw.

* * * * *